United States Patent [19]

Yoda

[11] 3,852,488

[45] Dec. 3, 1974

[54] MUSTARD PASTE WHOSE PUNGENCY MAY BE PRESERVED FOR LONG STORAGE AND PROCESS FOR MANUFACTURE THEREOF

[75] Inventor: Hayashi Yoda, Tokyo, Japan

[73] Assignee: S & B Shokuhin Co., Ltd., Tokyo, Japan

[22] Filed: Aug. 4, 1972

[21] Appl. No.: 277,886

[52] U.S. Cl.............. 426/199, 426/201, 426/221, 426/363, 426/372
[51] Int. Cl............................................ A23l 1/26
[58] Field of Search .......... 426/199, 194, 201, 221, 426/229, 33, 44, 49, 205–213, 223–342, 362–363, 369–370, 372

[56] References Cited
UNITED STATES PATENTS

| | | | |
|---|---|---|---|
| 1,077,164 | 10/1913 | Russ et al. ........................ | 426/372 |
| 3,007,799 | 11/1961 | Ferguson ........................... | 426/205 |

*Primary Examiner*—A. Louis Monacell
*Assistant Examiner*—R. A. Yoncoskie
*Attorney, Agent, or Firm*—Scrivener Parker Scrivener & Clarke

[57] ABSTRACT

A process for manufacture of mustard paste whose pungency may be preserved for a long storage is provided which comprises the steps of making a mixture of white and black mustard powder, other condiments and organic acid into a paste with sorbitol or sweetening agent, adding a small quantity of water to said paste, and adding and dispersing a mixture consisting of the extract of white mustard powder and the distillate of black mustard powder dissolved in fatty oil.

2 Claims, No Drawings

MUSTARD PASTE WHOSE PUNGENCY MAY BE PRESERVED FOR LONG STORAGE AND PROCESS FOR MANUFACTURE THEREOF

The present invention relates to mustard paste whose pungency and color will be preserved for a considerably long time and a process for manufacture thereof.

Generally mustard powder is made into a paste with water for pungency. However, the mustard paste sometimes changes its color from yellow to brown, has bitterness and loses its pungency. The causes for changing the qualities of mustard are not clear, but it is assumed that the qualities are adversely affected in case of black mustard by evaporation of aryl mustard oil, rapid decomposition of aryl mustard oil by myrosinase or thioglucosidase, decomposition of aryl mustard oil when it contacts with water, air, metals and the like and when it is exposed to light or to a high temperature, decomposition by bacteria and the like. In case of white mustard, the qualities are changed by hydrolysis of para-hydroxybenzyl isothiocyanate, and decomposition by myrosinase and at high temperature. The most important factor which causes the change in quality of mustard is considered to be the presence of water. Therefore when mustard powder is made into a paste with water, it is extremely difficult to eliminate the adverse effects of the enzyme, which is active in the presence of water at a suitable temperature, and of the temperature in order to preserve the pungency of mustard and to prevent the change of color.

The inventor has made extensive studies and experiments based upon the above observed fact and succeeded in generating pungency gradually by means of minimizing the water content and the adverse effects of the enzyme and temperature.

The primary object of the present invention is therefore to provide a process for manufacture of mustard paste whose pungency may be preserved for a considerably long time, comprising the steps of making a mixture of pulverized black and white mustard seeds into a paste with sorbitol or liquid sweetening agent other than water, adding a small quantity of water to said paste, kneading said paste, and adding and dispersing into said paste a mixture consisting of the extract of white mustard and distillate of black mustard dissolved in fatty oil.

According to the present invention, mustard powder is mixed with salt, suitable powder condiments. citric acid, glacial acetic acid and the like, and is made into a paste with sorbitol or sweetening agent other than water. Since the water content of sorbital or liquid sweetening agent is very small, pungency hardly gives off in the mustard paste at this step. After the paste has been uniformly kneaded, a very small quantity of water is added and is immediately charged into a colloid mill which breaks down the particles in the paste to an extremely fine dispersion state. Thus, the pungency of mustard is gradually given off.

It has been well known in the art that sorbitol and liquid sweetening agents such as millet jelly (honey) serves to preserve the pungency of mustard. However, in the past, sorbital or liquid sweetening agent was added to a mustard paste after water had been added to mustard powder to produce the pungency of mustard. This is a passive method for preserving the pungency of the mustard paste. In this conventional method, in order to obtain the sufficient pungency, sufficient water must be added and the contact with the enzyme must be facilitated so that the paste produces bitterness and changes its color to brown. The ability of preserving the pungency of mustard is increased very little.

However, according to the present invention, the pungency may be gradually generated and positively preserved, as shown in the following analysis. And since the contact with water and the enzyme is made stepwise, bitterness as well as color hardly occurs. Thus, the problems and defects of the prior art mustard paste can be overcome.

The mustard paste in accordance with the present invention has its pungency generated gradually as described above so that when the paste is made and for some time after it has been made, its pungency is not sufficient. To overcome this problem, the extract of white mustard powder and the distillate of black mustard powder are dissoved into fatty oil such as salad oil and added to the paste to supplement the pungency. Thus, the mustard pungency may be uniformly maintained for a considerably long time.

One example of mustard paste in accordance with the present invention is given below.

(1) Composition

| Components | Weight in Kg | Percentage |
|---|---|---|
| black mustard powder | 378.0 | 17.86 |
| white mustard powder | 162.0 | 7.65 |
| sorbitol | 800.0 | 37.80 |
| salad oil | 120.0 | 5.67 |
| refined salt | 200.0 | 9.45 |
| citric acid | 14.0 | 0.66 |
| water | 400.0 | 18.90 |
| turmeric | 9.2 | 0.43 |
| mixture of inosinic acid and guanylic acid | 0.80 | 0.038 |
| sodium glutamate | 20.0 | 0.94 |
| glacial acetic acid | 8.0 | 0.38 |
| extract of white mustard | 1.0 | 0.047 |
| distillate of black mustard | 4.0 | 0.190 |
| Total | 2,117.0 | 100.015 |

(2) Components obtained by analysis

| water | ash | fat | protein | fiber | sugar | salt | aryl isothiocyanate |
|---|---|---|---|---|---|---|---|
| (%) 33.27 | 9.38 | 9.43 | 8.75 | 1.02 | 38.16 | 8.75 | 0.300 | pH 3.9

(3) Relation between lapse of time and occurrence of bitterness and color change

| | | when manufd. | one month | two months | three months | four months |
|---|---|---|---|---|---|---|
| bitterness | 37°C | – | – | – | – | ± |
| | room temp. | – | – | – | – | – |
| | 5°C | – | – | – | – | – |
| color | 37°C | – | – | – | – | – |
| | room temp. | – | – | – | – | – |
| | 5°C | – | – | – | – | – |

(4) Quantity of aryl isothiocyanate, which gives off pungency of mustard

| temp. | when manufd. | one month | two months | three months | four months |
|---|---|---|---|---|---|
| 37°C | 0.300 | 0.316 | 0.285 | 0.290 | 0.270 |
| room temp. | 0.300 | 0.295 | 0.300 | 0.310 | 0.280 |
| 5°C | 0.300 | 0.310 | 0.305 | 0.290 | 0.300 |

Next, embodiments of the present invention are as follows.

EMBODIMENT 1

The following substances were mixed.

| | (g.) |
|---|---|
| mixture of white and black mustard powder (ratio = 1 : 4) | 500 |
| salt | 200 |
| mixture of sodium inocinate and sodium guanylate (ratio = 1 : 1) | 1 |
| glacial acetic acid | 8 |
| citric acid | 14 |
| turmeric | 10 |

The mixture was made into a paste with 800 g. of sorbitol.

Thereafter, the paste was added with 400 g. of water and charged into a colloid machine. Next a mixture consisting of the extract of white mustard, 1 g. and the distillate of black mustard 4 gr. dissolved in 120 g. of salad oil was added and dispersed into the paste. The product was packed into a container.

EMBODIMENT 2

The following substances were mixed.

| | (g.) |
|---|---|
| mixture of white and black mustard powder (ratio = 2.4 : 3) | 500 |
| salt | 190 |
| mixture of sodium inocinate and sodium guanylate (ratio = 1 : 1) | 1 |
| sodium glutamate | 20 |
| glacial acetic acid | 7 |
| citric acid | 15 |
| turmeric | 9 |

The mixture was made into a paste with 800 gr. of millet jelly. Thereafter, the paste was added with 380 g. of water and charged into a colloid machine. Next a mixture consisting of the extract of white mustard, 1.5 g., and the distillate of black mustard 5 g. dissolved in 120 g. of salad oil was added and dispersed into the paste. The product was packed into a container.

EMBODIMENT 3

The following substances were mixed.

| | (g.) |
|---|---|
| mixture of white and black mustard powder (ratio = 2.4 : 3) | 500 |
| salt | 190 |
| mixture of sodium inocinate and sodium guanylate (ratio = 1 : 1) | 1 |
| sodium glutamate | 20 |
| glacial acetic acid | 7 |
| citric acid | 15 |
| turmeric | 9 |

The mixture was made into a paste with 800 g. of invert sugar. Thereafter, the paste was added with 380 g. of water and charged into a colloid machine. Next a mixture consisting of the extract of white mustard, 1.5 g., and the distillate of black mustard 5 g. dissolved at 120 g. of salad oil was added and dispersed into the paste. The product was packed into a container.

What is claimed is:

1. A mustard paste characterized by preservation of its pungency, comprising a paste containing white and black mustard powder, organic acid and other condiments, a member selected from the group consisting of sorbitol and a liquid sweetening agent, and a small quantity of water, said paste having dispersed therein a mixture of an extract of white mustard powder and a distillate of black mustard powder dissolved into fatty oil.

2. A process for the manufacture of a mustard paste characterized by preservation of its pungency comprising the steps of making a mixture of white and black mustard powder, organic acid and other condiments into a paste with a member selected from the group consisting of sorbitol and a liquid sweetening agent, adding a small quantity of water to said paste and kneading said paste, and adding and dispersing into said paste a mixture of an extract of white mustard powder and a distillate of black mustard powder dissolved into a fatty oil.

* * * * *

UNITED STATES PATENT OFFICE
CERTIFICATE OF CORRECTION

PATENT NO. : 3,852,488
DATED : December 3, 1974
INVENTOR(S) : Hayashi Yoda

It is certified that error appears in the above-identified patent and that said Letters Patent are hereby corrected as shown below:

Column 1, lines 14, 15 and 16, change "aryl" to --allyl--

Signed and Sealed this nineteenth Day of August 1975

[SEAL]

Attest:

RUTH C. MASON
Attesting Officer

C. MARSHALL DANN
Commissioner of Patents and Trademarks